US012390908B2

(12) United States Patent
Beer

(10) Patent No.: US 12,390,908 B2
(45) Date of Patent: Aug. 19, 2025

(54) INTERNAL DUAL PAWL MECHANISM FOR INDEXABLE MOTORIZED RATCHET TOOLS

(71) Applicant: Snap-on Incorporated, Kenosha, WI (US)

(72) Inventor: Joshua M. Beer, Kenosha, WI (US)

(73) Assignee: Snap-on Incorporated, Kenosha, WI (US)

( * ) Notice: Subject to any disclaimer, the term of this patent is extended or adjusted under 35 U.S.C. 154(b) by 0 days.

(21) Appl. No.: 17/329,423

(22) Filed: May 25, 2021

(65) Prior Publication Data

US 2022/0379444 A1 Dec. 1, 2022

(51) Int. Cl.
*B25B 21/00* (2006.01)
*B25B 23/00* (2006.01)
*B25F 5/02* (2006.01)

(52) U.S. Cl.
CPC ........ *B25B 21/004* (2013.01); *B25B 23/0028* (2013.01); *B25F 5/02* (2013.01)

(58) Field of Classification Search
None
See application file for complete search history.

(56) References Cited

U.S. PATENT DOCUMENTS 1,888,793 A * 11/1932 Erickson ............... B25B 13/463 81/63
3,290,969 A 12/1966 Bergquist et al.
4,748,872 A 6/1988 Brown
4,765,449 A 8/1988 Peters
4,993,288 A * 2/1991 Anderson ............ B25B 13/463 81/57.39
5,535,646 A 7/1996 Allen et al.
5,537,899 A * 7/1996 Diedrich ............... B25B 21/004 81/62
5,784,934 A * 7/1998 Izumisawa ........... B25B 21/004 81/177.8

(Continued)

FOREIGN PATENT DOCUMENTS

CA 2146069 A1 3/1995
CN 110977855 A 4/2020

(Continued)

OTHER PUBLICATIONS

Combined Search and Examination for corresponding Application No. GB2207135.1 dated Nov. 17, 2022, 8 pages.

(Continued)

*Primary Examiner* — David S Posigian
*Assistant Examiner* — Dana Lee Poon
(74) *Attorney, Agent, or Firm* — Taft Stettinius & Hollister LLP

(57) ABSTRACT

A pawl mechanism for an indexable tool and adapted to selectively transmit rotational motion of a yoke of the tool to a drive lug of the tool in one of first and second rotational directions. The pawl mechanism including a pawl carrier, first and second pawls pivotably coupled to the pawl carrier, and a selector switch rotatably coupled to the pawl carrier and adapted to selectively position the first and second pawls to transmit rotational motion of the yoke to the drive lug in one of the first and second rotational directions.

19 Claims, 7 Drawing Sheets

(56) References Cited

U.S. PATENT DOCUMENTS

| | | | | |
|---|---|---|---|---|
| 6,305,246 | B1 * | 10/2001 | Horvath | B25B 21/004 81/57.39 |
| 6,311,583 | B1 | 11/2001 | Izumisawa | |
| 6,324,947 | B2 * | 12/2001 | Jarvis | B25G 1/063 81/177.8 |
| 6,435,060 | B1 | 8/2002 | Izumisawa | |
| 6,578,643 | B2 | 6/2003 | Izumisawa | |
| 6,640,669 | B2 | 11/2003 | Izumisawa | |
| 6,860,174 | B2 | 3/2005 | Kusama | |
| 6,928,902 | B1 | 8/2005 | Eyssallenne | |
| 7,121,167 | B1 | 10/2006 | Miner | |
| 7,509,894 | B2 | 3/2009 | Chen | |
| 8,584,555 | B2 | 11/2013 | Chan | |
| 8,708,119 | B2 | 4/2014 | Su | |
| 8,757,031 | B2 | 6/2014 | Su | |
| 8,844,408 | B2 | 9/2014 | Chen | |
| 9,010,509 | B2 | 4/2015 | Kobayashi | |
| 9,061,404 | B2 | 6/2015 | Dohogne | |
| 9,067,309 | B2 | 6/2015 | McMenemy | |
| 9,360,060 | B2 | 6/2016 | Su | |
| 9,713,866 | B2 | 7/2017 | Lin et al. | |
| 10,525,572 | B2 * | 1/2020 | Hu | H02K 7/108 |
| 2001/0000092 | A1 | 4/2001 | Jarvis | |
| 2002/0117028 | A1 | 8/2002 | Kusama | |
| 2003/0094081 | A1 | 5/2003 | Becker et al. | |
| 2005/0279191 | A1 * | 12/2005 | Horvath | B25B 21/004 81/57.39 |
| 2006/0027048 | A1 | 2/2006 | Chen | |
| 2007/0234854 | A1 | 10/2007 | Collins | |
| 2010/0011913 | A1 * | 1/2010 | Horvath | B25B 13/465 81/60 |
| 2012/0186400 | A1 * | 7/2012 | Elger | B25B 13/465 81/54 |
| 2013/0255448 | A1 | 10/2013 | Lai | |
| 2014/0020516 | A1 | 1/2014 | Lai et al. | |
| 2014/0083257 | A1 | 3/2014 | Su | |
| 2014/0202287 | A1 | 7/2014 | Lai et al. | |
| 2014/0338503 | A1 * | 11/2014 | Beer | B25F 5/02 173/217 |
| 2015/0266171 | A1 | 9/2015 | Lai et al. | |
| 2017/0190029 | A1 * | 7/2017 | Cuesta | B25B 23/0028 |
| 2018/0071901 | A1 * | 3/2018 | Silha | B25B 23/1425 |
| 2019/0275647 | A1 * | 9/2019 | Silha | B25B 23/147 |
| 2020/0254593 | A1 | 8/2020 | Hayashi et al. | |

FOREIGN PATENT DOCUMENTS

| | | | |
|---|---|---|---|
| CN | 211992684 | U | 11/2020 |
| CN | 211992702 | U | 11/2020 |
| DE | 202011102889 | | 10/2011 |
| EP | 2711133 | | 3/2014 |
| JP | 10015841 | | 1/1998 |
| JP | 2001347469 | | 12/2001 |
| JP | 2004314262 | | 11/2004 |
| TW | 201134613 | | 10/2011 |
| TW | M413569 | | 10/2011 |
| TW | M417233 | | 12/2011 |
| TW | 201408441 | A | 3/2014 |
| TW | 201710040 | | 3/2017 |
| TW | 202114826 | A | 4/2021 |

OTHER PUBLICATIONS

Taiwan Office Action for corresponding Application No. 11220218010 dated Mar. 8, 2023, 13 pages.

United Kingdom Examination Report for corresponding UK Application No. GB2207135.1, dated Jul. 26, 2023, 5 pages.

United Kingdom Examination Report for corresponding UK Application No. GB2207135.1, dated Dec. 15, 2023, 7 pages.

United Kingdom Intellectual Property Office, Examination Report issued in corresponding Application No. GB2207135.1, dated Apr. 2, 2024, 6 pp.

United Kingdom Intellectual Property Office, Examination Report issued in corresponding Application No. GB2207135.1, dated Jul. 3, 2024, 5 pp.

Chinese Patent Office, First Office Action issued in corresponding Application No. 202210575973.2, dated May 20, 2024, 14 pp.

Canadian Patent Office, Examination Report issued in corresponding Application No. 3,159,597, dated Oct. 10, 2024, 4 pp.

Chinese Patent Office, Second Office Action issued in corresponding Application No. 202210575973.2, dated Feb. 25, 2025, 16 pp.

Chinese Patent Office, Decision on Rejection issued in corresponding Application No. 202210575973.2, dated May 13, 2025, 10 pp.

* cited by examiner

INTERNAL DUAL PAWL MECHANISM FOR INDEXABLE MOTORIZED RATCHET TOOLS

TECHNICAL FIELD OF THE INVENTION

The present invention relates generally to indexable hand tools, and more particularly, the present invention relates to an internal dual pawl mechanism for indexable ratchet tools.

BACKGROUND OF THE INVENTION

Power hand tools, such as, for example, motorized ratchet wrenches and drivers, are commonly used in automotive, industrial, and household applications to install and remove threaded fasteners and apply torque and/or angular displacement to a work piece, such as a threaded fastener, for example. Power hand tools, such as cordless power ratchets and drivers, generally include an electric motor contained in a housing, along with other components, such as switches, light emitting diodes (LEDs), and batteries, for example. The housing may be a clamshell-type housing that generally includes two or more housing portions coupled together by fasteners, such as screws or rivets, to cooperatively form the housing.

Power hand tools, such as, for example, motorized ratchet wrenches and drivers, include a ratcheting-type head that is driven by a motor. However, the head is generally fixed relative to the tool body. The fixed nature of the head can make it difficult to reach fasteners and other work pieces located in tight or otherwise hart to access places.

In order to better access work pieces located in tight or otherwise hard to access places, conventional power tools utilize an indexable ratchet head that can pivot relative to the housing of the tool. These conventional tools have single internal pawl or single external pawl ratchet mechanisms. However, these pawl ratchet mechanisms have relatively low torque application capabilities and fatigue strength. This low ultimate torque output makes it difficult for power tools having these types of ratchet mechanisms to tighten and untighten work pieces with a high prevailing torque.

Other conventional power tools have external double pawl mechanisms. However, these pawl ratchet mechanisms also have relatively low torque output due to limited impact energy caused by the pawl teeth impacting the ratchet gear teeth, which makes it difficult for power tools having these types of ratchet mechanisms to tighten and untighten work pieces with a high prevailing torque. Moreover, the ratchet heads are enlarged to accommodate all the components required for the external double pawl mechanism.

SUMMARY OF THE INVENTION

The present invention relates broadly to an internal dual pawl mechanism for indexable ratchet tools, such as, for example, a motorized ratcheting-type tool. The ultimate torque and fatigue strength of the internal dual pawl mechanism of the present invention is improved compared to pawl mechanisms in conventional indexable tools. Specifically, the ultimate torque output of the pawl mechanism of the present invention is approximately double the ultimate torque output of a conventional single internal pawl mechanism. Moreover, the size of the ratchet head utilizing the pawl mechanism of the present invention is increased marginally compared to a ratchet utilizing a conventional single internal pawl mechanism, and thus significantly smaller than a ratchet head housing a dual pawl external pawl mechanism.

In an embodiment, the present invention broadly relates to tool having a first housing portion. The tool broadly comprises a ratchet housing portion pivotably coupled to the first housing portion, a yoke rotatably disposed in the ratchet housing, a pawl mechanism disposed in the ratchet housing portion and adapted to selectively transmit rotational motion of the yoke to a drive lug in one of first and second rotational directions. The pawl mechanism includes a pawl carrier rotatably disposed in the ratchet housing portion, first and second pawls pivotably coupled to the pawl carrier, and a selector switch rotatably coupled to the pawl carrier and adapted to selectively position the first and second pawls to transmit rotational motion of the yoke to the drive lug in one of the first and second rotational directions.

In another embodiment, the present invention broadly relates to a pawl mechanism for an indexable tool and adapted to selectively transmit rotational motion of a yoke of the tool to a drive lug of the tool in one of first and second rotational directions. The pawl mechanism includes a pawl carrier, first and second pawls pivotably coupled to the pawl carrier, and a selector switch rotatably coupled to the pawl carrier and adapted to selectively position the first and second pawls to transmit rotational motion of the yoke to the drive lug in one of the first and second rotational directions.

BRIEF DESCRIPTION OF THE DRAWINGS

For the purpose of facilitating an understanding of the subject matter sought to be protected, there is illustrated in the accompanying drawing embodiments thereof, from an inspection of which, when considered in connection with the following description, the subject matter sought to be protected, its construction and operation, and many of its advantages, should be readily understood and appreciated.

DETAILED DESCRIPTION

Figure 1:
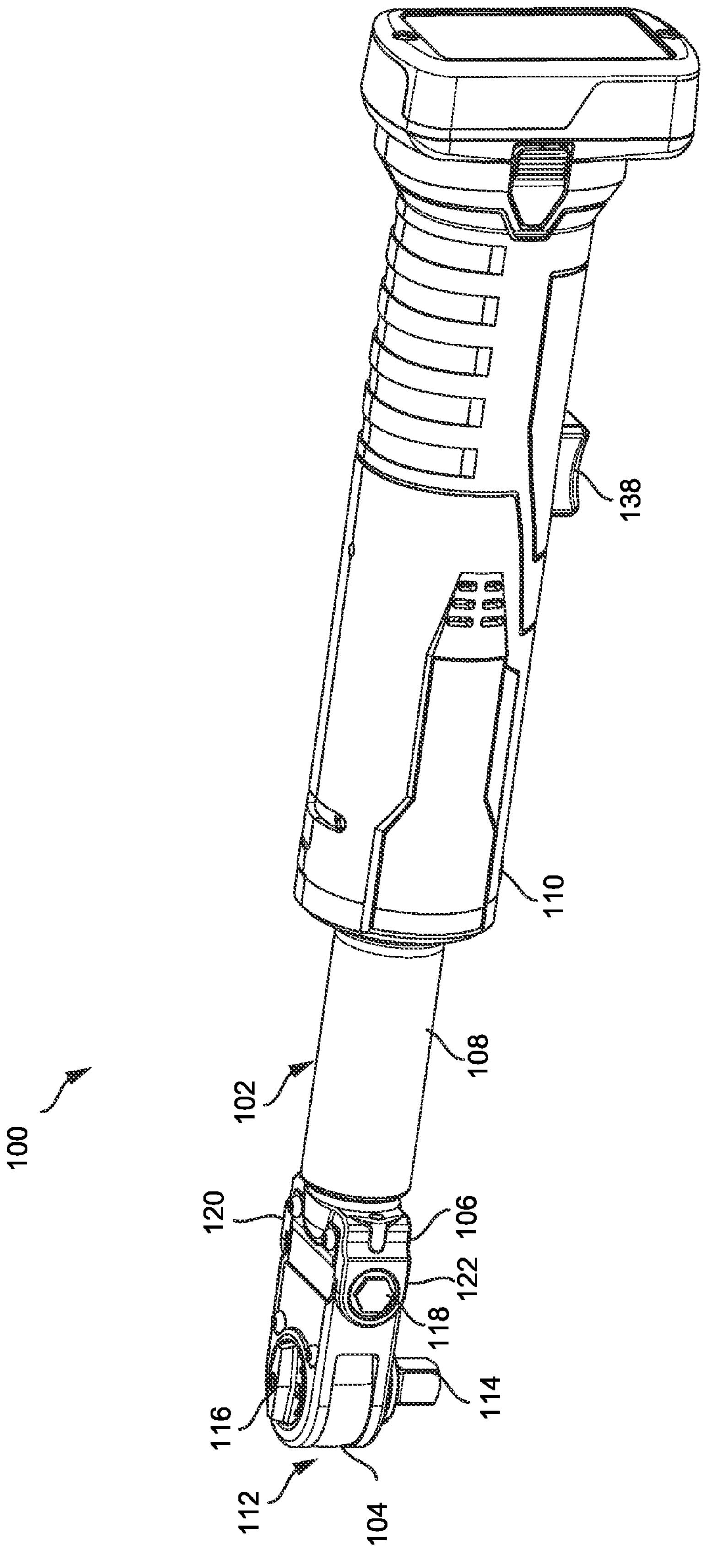
FIG. 1 is a perspective side view of an exemplar ratcheting tool incorporating an embodiment of the present invention.
Figure 2:
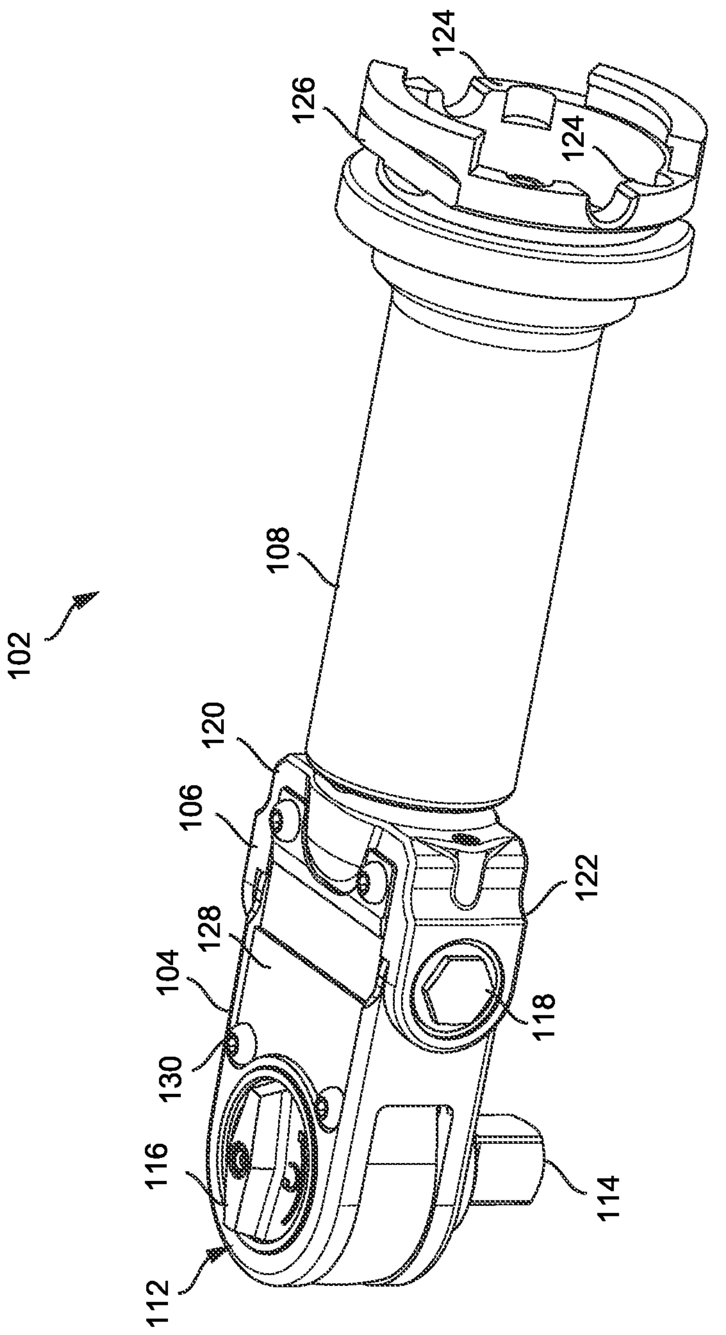
FIG. 2 is a side perspective view of a ratchet housing and first and second housing portions of the ratcheting tool of FIG. 1, according to an embodiment of the present invention.

While the present invention is susceptible of embodiments in many different forms, there is shown in the drawings, and will herein be described in detail, embodiments of the invention, including a preferred embodiment, with the understanding that the present disclosure is to be considered as an exemplification of the principles of the invention and is not intended to limit the broad aspect of the invention to embodiments illustrated. As used herein, the term "present invention" is not intended to limit the scope of the claimed invention and is instead a term used to discuss exemplary embodiments of the invention for explanatory purposes only.

The present invention relates broadly to an internal dual pawl mechanism for indexable ratchet tools, such as, for example, a motorized ratcheting-type tool. The ultimate torque output and fatigue strength of the internal dual pawl mechanism of the present invention is improved and greater compared to conventional pawl mechanisms with indexable tools. Specifically, the ultimate torque output of the pawl mechanism of the present invention is approximately double the ultimate torque output of a conventional single internal pawl mechanism. Moreover, the size of the ratchet head utilizing the pawl mechanism of the present invention is increased marginally, compared to a ratchet utilizing a conventional single internal pawl mechanism, and yet smaller than a ratchet head housing a dual pawl external pawl mechanism.

Referring to FIGS. 1-8, an indexable tool 100, such as, for example, a cordless ratchet-type tool, includes a tool housing 102 having a ratchet housing portion 104, a first housing portion 106, a second housing portion 108, and a motor housing portion 110. As discussed herein, the indexable tool 100 is a ratchet-type wrench. However, the present invention is not limited as such, and the tool 100 can be any type of hand-held tool, including, without limitation, electrically or pneumatically powered tools, such as, a drill, router, impact wrench, ratchet wrench, screwdriver, or other powered tool.

The ratchet housing portion 104 encloses/houses a pawl mechanism 112 that transfers torque from a motor of the tool 100 to a drive lug 114 in a manner described below. The drive lug 114 is adapted to apply torque to a work piece, such as a fastener, via an adapter, bit, or socket coupled to the drive lug 114, such as a bi-directional ratcheting square or hexagonal drive. As illustrated, the drive lug 114 is a "male" connector designed to fit into or matingly engage a female counterpart. However, the drive lug 114 may alternately include a "female" connector designed to matingly engage a male counterpart. The drive lug 114 may also be structured to directly engage a work piece without requiring coupling to an adapter, bit, or socket. The rotational direction of the drive lug 114 can be selected by rotation of a selector switch 116 to be either a first or second rotational direction (such as, clockwise or counterclockwise) in a manner described below.

Figure 3:
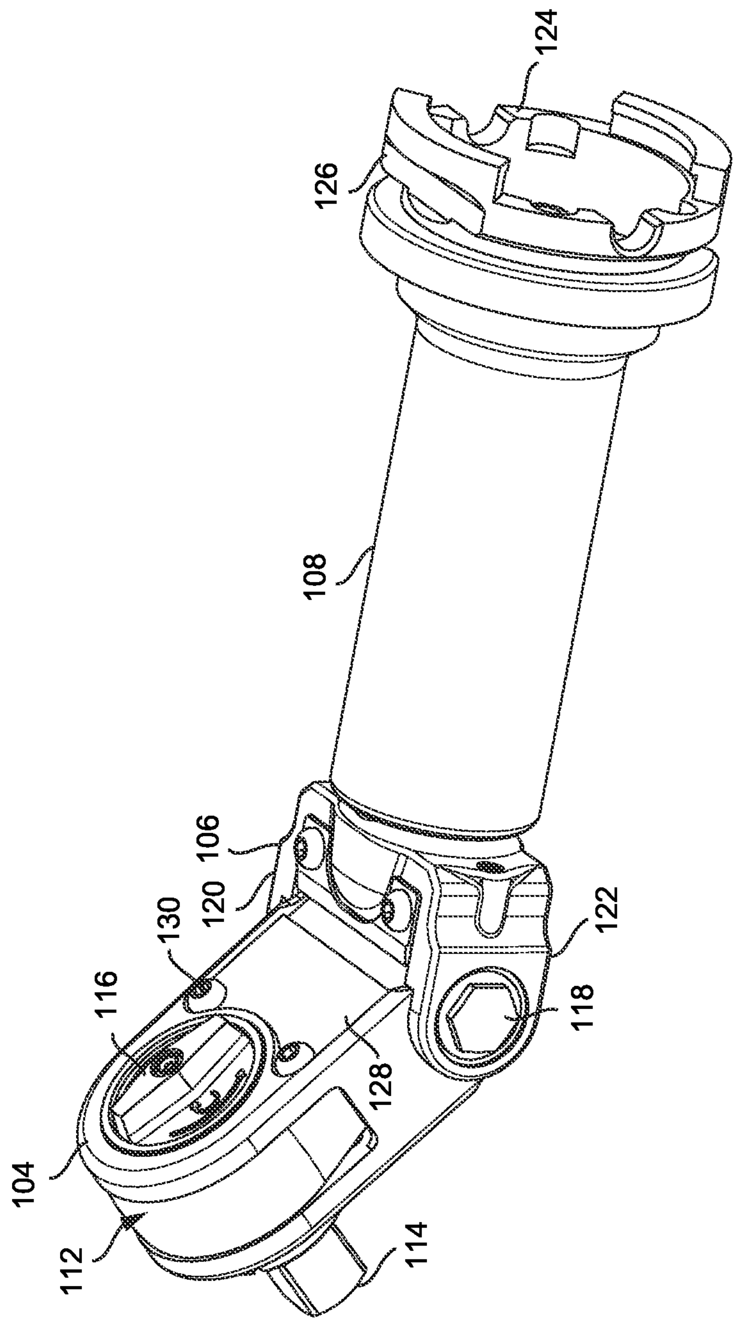
FIG. 3 is a side perspective view of the ratchet housing pivoted relative to the first and second housing portions of the ratcheting tool of FIG. 1, according to an embodiment of the present invention.
Figure 4:
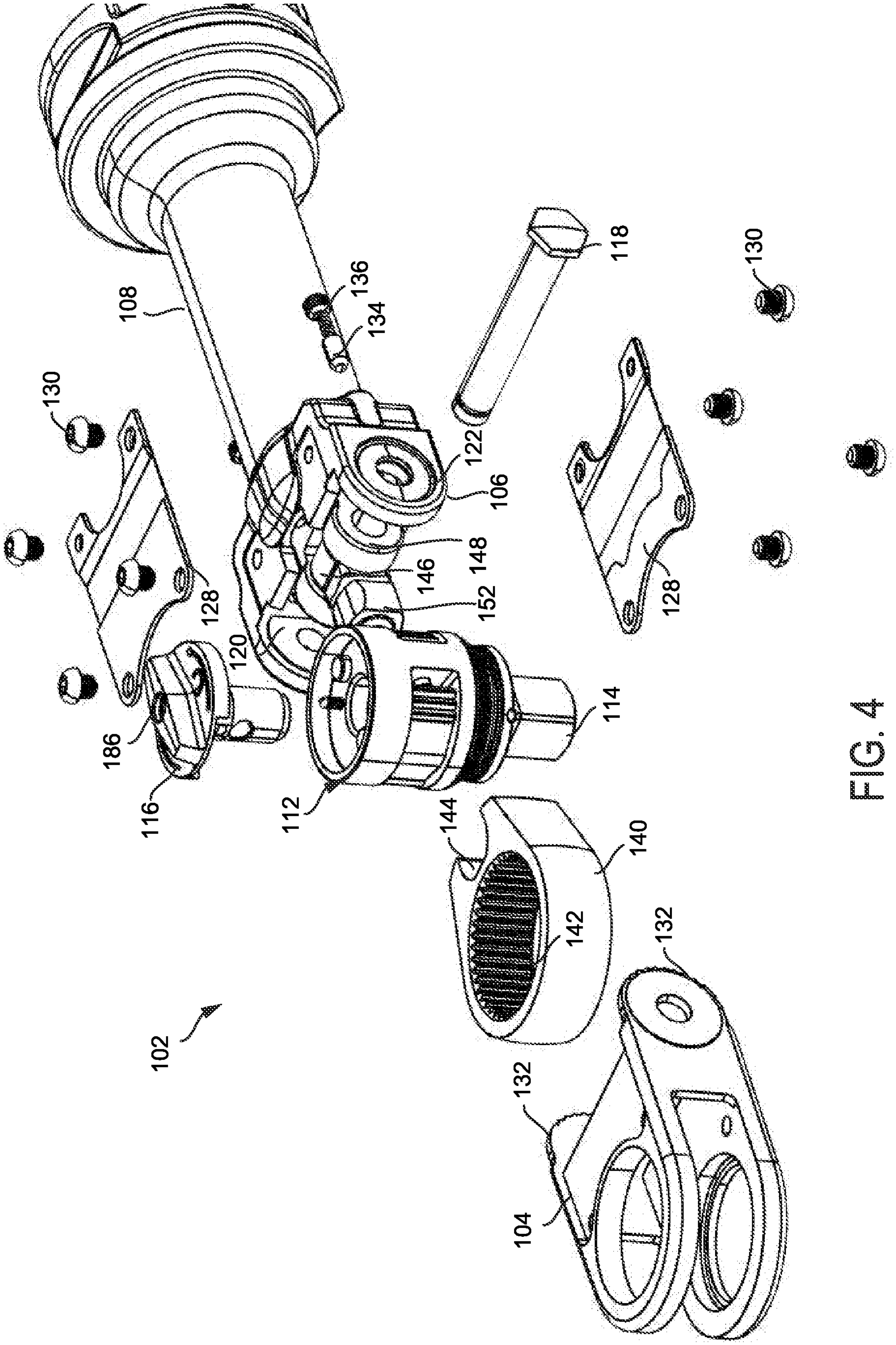
FIG. 4 is a side perspective exploded, disassembled view of the ratchet and first and second housing portions of the ratcheting tool of FIG. 2, according to an embodiment of the present invention.
Figure 5:
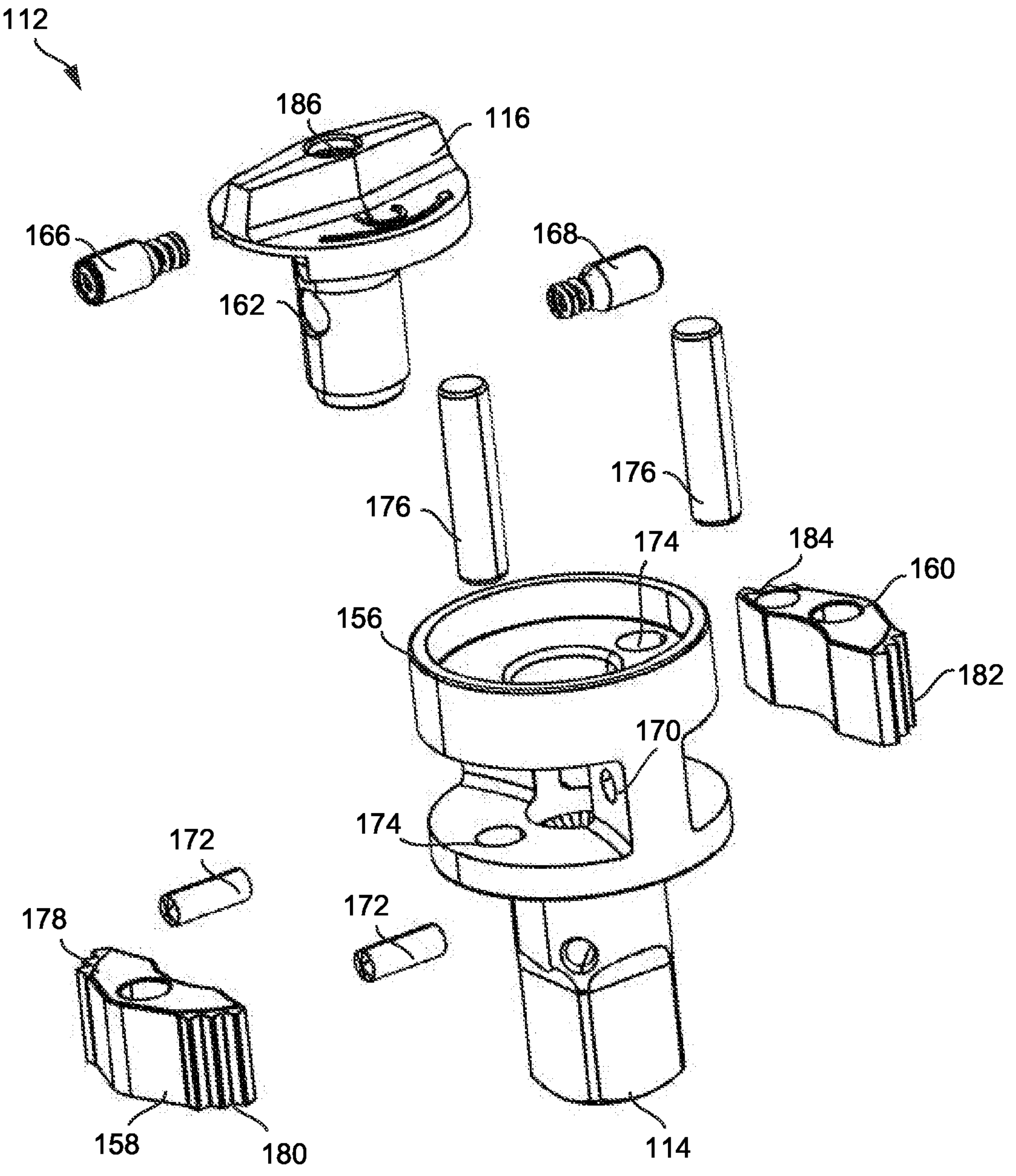
FIG. 5 is a side perspective exploded, disassembled view of the pawl mechanism of the ratcheting tool of FIG. 1, according to an embodiment of the present invention.
Figure 6:
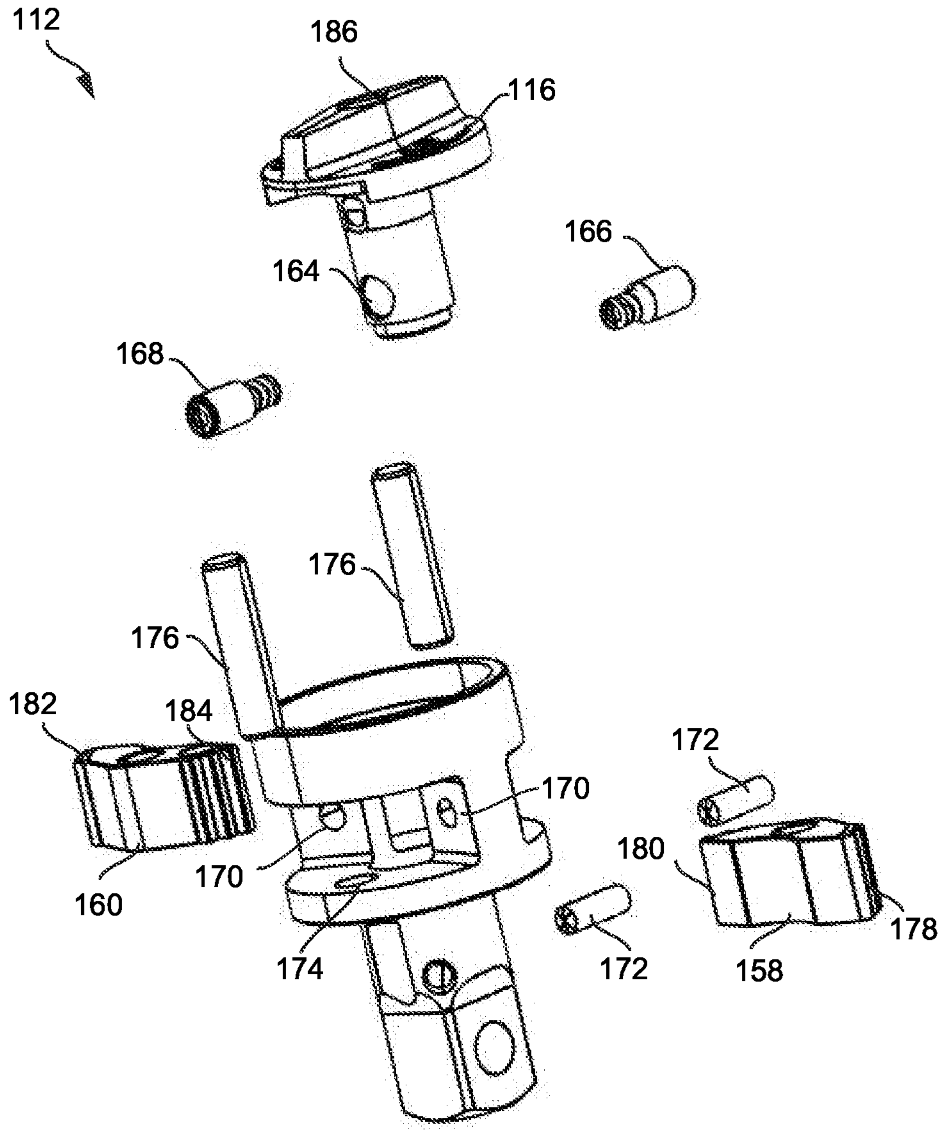
FIG. 6 is another side perspective exploded, disassembled view of the pawl mechanism of the ratcheting tool of FIG. 1, according to an embodiment of the present invention.

The ratchet housing portion 104 and the first housing portion 106 are pivotably coupled to each other, for example, via a housing pivot pin 118. The housing pivot pin 118 may be a pin, rivet, threaded fastener, or other suitable fastener, that provides a pivotable coupling between the ratchet housing portion 104 and the first housing portion 106. As illustrated in FIG. 3, the pivotable coupling allows the ratchet housing portion 104 to pivot relative to a longitudinal axis of the pivot pin 118, which is substantially perpendicular to a longitudinal axis of the tool 100, thereby allowing the ratchet housing portion 104 to pivot relative to the first housing portion 106, the second housing portion 108, and the motor housing portion 110.

The first housing portion 106 includes first 118 and second 120 arms adapted to receive the housing pivot pin 118, thereby pivotably coupling the ratchet housing portion 104 and the first housing portion 106. In an embodiment, the first housing portion 106 is threadably coupled to the second housing portion 108. In another embodiment, the first 106 and second housing portions are a single integral housing.

The second housing portion 108 encloses/houses a crankshaft 150 adapted to operably couple the pawl mechanism 112 to the motor in a well-known manner. The second housing portion 108 is adapted to couple to the motor housing 110 using attachment features including, for example, cutouts 124 and/or channels 126. In an embodiment, the attachment features are machined into the second housing portion 108 after the second housing portion 108 is threadably coupled to the first housing portion 106 to ensure the ratchet housing portion 104 is properly oriented relative to the motor housing portion 110. In an embodiment, the second housing portion 108 is one of a number of interchangeable second housing portions having different lengths and/or configurations to accommodate crankshafts having different lengths. In an embodiment, the second housing portion 108 is a machined part, thereby allowing different lengths and configurations to be made at lower costs and complexity, compared to a cast part since multiple molds do not have to be made or used.

Housing cover plates 128 are coupled to the first 106 and second 108 housing portions via, for example, fasteners 130, such as, for example, rivets, screws, etc. The housing cover plates 128 restrict containments from infiltrating the interiors of the first 106 and second 108 housing portions and potentially damaging components contained therein.

In an embodiment, the ratchet housing 104 is selectively positioned relative to the first 106 and second 108 housing portions by a detent mechanism. In this embodiment, the ratchet housing 104 includes indents 132 adapted to selectively engage one or more detents 134, such as, for example, a detent pin or ball, disposed in the first housing portion 106. The detent(s) 134 is biased towards the indents 132 via a biasing member 136, such as, for example, a spring.

The motor housing portion 110 encloses or houses one or more of an electric or pneumatic motor, a switch assembly, display with buttons for configuring and setting the tool, one or more status indicators such as light emitting diodes, and other components for operation of the tool, for example. The motor housing portion 110 may also include a textured or knurled grip to improve a user's grasp of the tool 100 during use. In an embodiment, the motor housing portion 110 includes first and second motor housing portions coupled together in a clamshell-type manner. In an embodiment, the motor housing portion 110 is comprises plastic or metal.

The motor (not shown) is adapted to operably engage the pawl mechanism 112 via the crankshaft 150 to provide torque to the drive lug 114. In an embodiment, the motor may be a brushless or brushed electric motor, a pneumatic motor, or any other suitable motor. A power source (not shown) can be associated with the tool 100 to provide power to the tool 100 for operation, such as, for example, electric, hydraulic, or pneumatic, to operate the motor. In an embodiment, the power source can be housed in an end of the motor housing portion 110, opposite the ratchet housing portion 104, a midsection of the motor housing portion 110, or any other portion of the tool 100/motor housing portion 110. The power source may also be an external component not housed by the tool 100, but that is operatively coupled to the tool 100 through, for example, wired or wireless means. In an embodiment, the power source is a removable and/or rechargeable battery that is adapted to be disposed in the end of the motor housing portion 110 and electrically coupled to corresponding terminals of the tool 100 in a well-known manner.

In an embodiment, the tool 100 includes a trigger 138 that can be actuated by a user to cause the tool 100 to operate. For example, the user can depress the trigger 138 inwardly to selectively cause power to be drawn from the power source and cause the motor to operate and provide torque to the drive lug 114 in a desired rotational direction. Any suitable trigger 138 or switch can be implemented without departing from the spirit and scope of the present invention. For example, the trigger 138 may also be biased such that the trigger 138 is inwardly depressible, relative to the tool 100, to cause the tool 100 to operate, and a release of the trigger 138 causes the trigger 138 to move outwardly, relative to the tool 100, to cease operation of the tool 100 via the biased nature of the trigger 138. The trigger 138 and switch mechanism may also be a variable speed type mechanism. In this regard, actuation or depression of the trigger 138 causes the motor to operate at a faster speed the further the trigger 138 is depressed.

A yoke 140 is rotatably disposed in the ratchet housing portion 104. The yoke 140 includes gear teeth 142 disposed on an internal circumference of the yoke 140. The yoke further includes a recess 144 adapted to be operably coupled to the crankshaft 150 via first 146 and second 148 drive members, as described below.

The first drive member 146 is rotatably coupled to the recess 144 of the yoke 140, such as, for example, by a first bushing 152, and slidably coupled to the housing pivot pin 118. The second drive member 148 is also slidably coupled to the housing pivot pin 118 and includes two arms disposed on either side of the first drive member such that the first 146 and second 148 drive members move along the housing pivot pin 118 simultaneously. The second drive member 148 is also rotatably coupled to the crankshaft 150 via a second bushing 154. Accordingly, rotational motion of the crankshaft 150 caused by operation of the motor drives the first 146 and second 148 drive members in a reciprocating linear motion along the housing pivot pin 118. The reciprocating linear motion of the first drive member 146 is transmitted to the yoke 140, so that the yoke 140 rotates back and forth repeatedly in the ratchet housing portion 104. The rotational motion of the yoke 140 is transmitted to the drive lug 114 via the pawl mechanism 112 in one of the first and second rotational directions, as described below.

The pawl mechanism 112 is rotatably disposed in the ratchet housing portion 104. The pawl mechanism 112 includes the selector switch 116, a pawl carrier 156, and first 158 and second 160 pawls. The pawl mechanism 112 transmits the rotational motion of the yoke 140 to the drive lug 114 in one of the selected first and second rotational directions.

The selector switch 116 is rotatably coupled to the pawl carrier 156 and is adapted to selectively position the first 158 and second 160 pawls to transmit rotational motion of the yoke 140 to the drive lug 114 in either one of the first and second rotational directions. The selector switch 116 can be a lever or knob. The selector switch 116 includes first 162 and second 164 selector switch apertures and first 166 and second 168 outwardly biased members respectively received in the first 162 and second 164 selector switch apertures. The first 166 and second 168 outwardly biased members are respectively biased towards the first 158 and second 160 pawls using, for example, springs. In an embodiment, the selector switch 116 has a grease fitting 186 adapted to allow grease to be applied to the pawl mechanism components for continued maintenance and use.

The pawl carrier 156 is rotatably disposed in the ratchet housing portion 104. In an embodiment, the pawl carrier 156 is integral with the drive lug 114. However, the invention is not limited as such and the pawl carrier 156 and drive lug 114 can be separate components coupled together. The pawl carrier 156 includes pawl positioning member apertures 170 adapted to respectively receive a pawl positioning member 172 slidably disposed therein. In an embodiment, the pawl positioning members 172 are pins. The pawl carrier 156 further includes pivot member apertures 174 adapted to respectively receive a pivot member 176. In an embodiment, the pivot members 176 are pins.

The first pawl 158 is pivotably coupled to the pawl carrier 156 via one of the pivot members 176. The first pawl 158 includes first teeth 178 and second teeth 180 that are adapted to selectively engage the gear teeth 142 of the yoke based on a selected position of the selector switch 116. For example, when the selector switch 116 is disposed in a positon to select the first rotational direction (e.g., clockwise), the first teeth 178 engage the gear teeth 142. Similarly, when the selector switch 116 is disposed in a position to select the second rotational direction (e.g., counter-clockwise), the second teeth 180 engage the gear teeth 142.

The second pawl 160 is pivotably coupled to the pawl carrier 156 via the other of the pivot members 176. The second pawl 160 includes first teeth 182 and second teeth 184 that are adapted to selectively engage the gear teeth 142 of the yoke based on a position of the selector switch 116. For example, when the selector switch 116 is disposed in a position to select the first rotational direction (e.g., clockwise), the first teeth 182 engage the gear teeth 142. Similarly, when the selector switch 116 is disposed in a position to select the second rotational direction (e.g., counter-clockwise), the second teeth 184 engage the gear teeth 142. In an embodiment, the first 158 and second 160 pawls are substantially identical. The first 158 and second 160 pawls are adapted to pivot substantially simultaneously about the respective pivot members 176 via the pawl positioning members 172.

Figure 7:
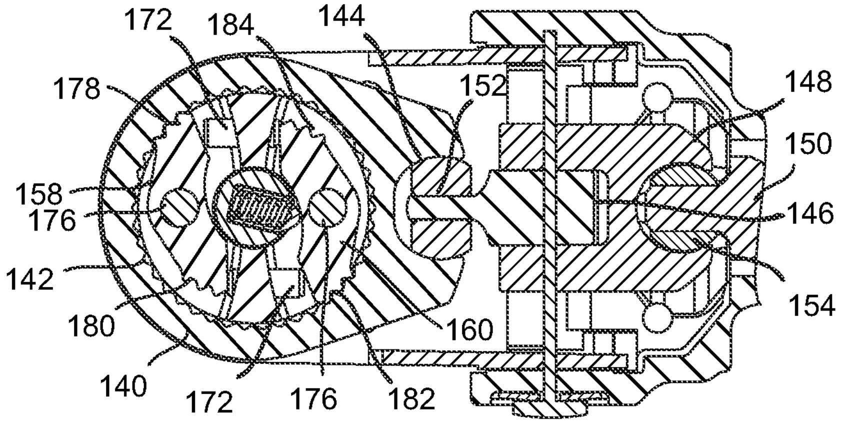
FIG. 7 is a top detailed view of the pawl mechanism of the ratcheting tool of FIG. 1, selecting a first rotational drive direction, according to an embodiment of the present invention.

As illustrated in FIG. 7, when the selector switch 116 is moved to a position to select the first rotational direction (e.g., clockwise), the first 166 and second 168 outwardly biased members respectively engage the first 158 and second 160 pawls to cause the first 158 and second 160 pawls to pivot about respective pivot members 176 such that the first teeth 178 of the first pawl 158 and the first teeth 182 of the second pawl 160 engage the gear teeth 142 of the yoke 140.

Figure 8:
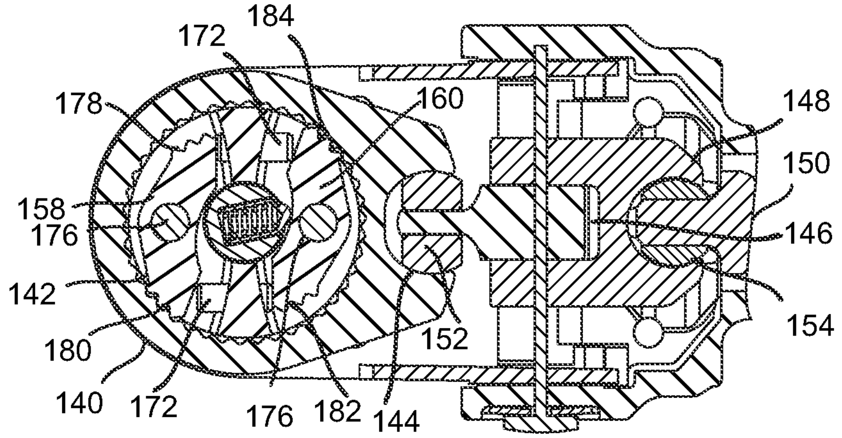
FIG. 8 is a top detailed view of the pawl mechanism of the ratcheting tool of FIG. 1, selecting a second rotational drive direction, according to an embodiment of the present invention.

As illustrated in FIG. 8, when the selector switch 116 is moved to a position to select the second rotational direction (e.g., counter-clockwise), the first 166 and second 168 outwardly biased members respectively engage the first 158 and second 160 pawls to cause the first 158 and second 160 pawls to pivot about respective pivot members 176 such that the second teeth 180 of the first pawl 158 and the second teeth 184 of the second pawl 160 engage the gear teeth 142 of the yoke 140.

As used herein, the term "coupled" and its functional equivalents are not intended to necessarily be limited to direct, mechanical coupling of two or more components. Instead, the term "coupled" and its functional equivalents are intended to mean any direct or indirect mechanical, electrical, or chemical connection between two or more objects, features, work pieces, and/or environmental matter.

"Coupled" is also intended to mean, in some examples, one object being integral with another object. As used herein, the term "a" or "one" may include one or more items unless specifically stated otherwise.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:

1. A tool having a first housing portion, the tool comprising:

- a ratchet housing portion pivotably coupled to the first housing portion by a pivot pin,
- a drive member disposed on the pivot pin and adapted to be driven linearly along the pivot pin;
- a yoke rotatably disposed in the ratchet housing and operably coupled to the drive member, wherein linear movement of the drive member along the pivot pin causes rotational motion of the yoke; and
- a pawl mechanism disposed in the ratchet housing portion and adapted to selectively transmit rotational motion of the yoke to a drive lug in either one of first and second rotational directions, wherein the pawl mechanism includes:
  - a pawl carrier rotatably disposed in the ratchet housing portion;
  - first and second pawls pivotably coupled to the pawl carrier; and
- a selector switch rotatably coupled to the pawl carrier and adapted to selectively position the first and second pawls to transmit rotational motion of the yoke to the drive lug in one of the first and second rotational directions.

2. The tool of claim 1, wherein the ratchet housing portion includes indents adapted to selectively engage a detent disposed in the first housing portion to selectively position the ratchet housing portion relative to the first housing portion, wherein the detent is biased towards the ratchet housing portion by a biasing member.

3. The tool of claim 1, further comprising a second housing portion threadably coupled to the first housing portion.

4. The tool of claim 3, further comprising a motor housing portion, wherein the second housing portion has a first end coupled to the first housing portion and a second end coupled to the motor housing portion, wherein the second housing portion includes one or more of cutouts and channels disposed at the second end and coupled to the motor housing portion.

5. The tool of claim 4, wherein the motor housing portion includes first and second motor housing portions coupled together in a clamshell type manner.

6. The tool of claim 1, wherein the yoke includes gear teeth disposed on an internal circumference of the yoke, and wherein the first and second pawls respectively include pawl teeth adapted to selectively engage the gear teeth based on a selected position of the selector switch.

7. The tool of claim 1, wherein the first and second pawls are pivotably coupled to the pawl carrier by respective pivot members received by the pawl carrier.

8. The tool of claim 7, wherein pawl positioning members are slidably disposed in the pawl carrier and are adapted to cause the first and second pawl to substantially simultaneously pivot about the respective pivot members.

9. The tool of claim 1, wherein the selector switch includes first and second outwardly biased members adapted to respectively engage the first and second pawls to selectively position the first and second pawls to transmit rotational motion of the yoke to the drive lug in one of the first and second rotational directions.

10. The tool of claim 1, wherein the pawl carrier is integral with the drive lug.

11. The tool of claim 1, wherein the pawl carrier is coupled to the drive lug.

12. A pawl mechanism for an indexable tool and that is adapted to selectively transmit rotational motion of a yoke of the tool to a drive lug of the tool in one of first and second rotational directions, the pawl mechanism comprising:

- a pawl carrier;
- first and second pawls pivotably coupled to the pawl carrier; and
- a selector switch rotatably coupled to the pawl carrier and adapted to selectively position the first and second pawls to transmit rotational motion of the yoke to the drive lug in one of the first and second rotational directions; and
- a grease fitting disposed in the selector switch and adapted to allow grease to be applied to the pawl mechanism.

13. The pawl mechanism of claim 12, wherein the pawl carrier is integral with the drive lug.

14. The pawl mechanism of claim 12, wherein the first and second pawls are pivotably coupled to the pawl carrier by respective pivot members received by the pawl carrier.

15. The pawl mechanism of claim 14, wherein pawl positioning members are slidably disposed in the pawl carrier and are adapted to cause the first and second pawl to substantially simultaneously pivot about the respective pivot members.

16. The pawl mechanism of claim 12, wherein the selector switch includes first and second outwardly biased members adapted to respectively engage the first and second pawls to selectively position the first and second pawls to transmit rotational motion of the yoke to the drive lug in one of the first and second rotational directions.

17. The pawl mechanism of claim 12, wherein the first and second pawls are substantially identical.

18. The pawl mechanism of claim 12, wherein the pawl carrier is coupled to the drive lug.

19. The pawl mechanism of claim 12, wherein the first and second pawls respectively include pawl teeth adapted to selectively engage gear teeth disposed on an internal circumference of the yoke based on a selected position of the selector switch.

* * * * *